United States Patent
Lindblom et al.

(10) Patent No.: US 6,682,275 B1
(45) Date of Patent: Jan. 27, 2004

(54) DEEP HOLE DRILL

(75) Inventors: Stefan Lindblom, Gävle (SE); Åke Danielsson, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 92 days.

(21) Appl. No.: 10/018,775

(22) PCT Filed: Jun. 13, 2000

(86) PCT No.: PCT/SE00/01236

§ 371 (c)(1),
(2), (4) Date: Mar. 5, 2002

(87) PCT Pub. No.: WO00/78489

PCT Pub. Date: Dec. 28, 2000

(30) Foreign Application Priority Data

Jun. 21, 1999 (SE) .............................................. 9902354

(51) Int. Cl.⁷ .............................................. B23B 51/06
(52) U.S. Cl. ............................. 408/59; 408/83; 408/705
(58) Field of Search ........................... 408/81, 83, 223, 408/224, 57, 59, 56, 227, 229, 230, 705

(56) References Cited

U.S. PATENT DOCUMENTS

| 1,304,981 A |   | 5/1919 | Hoagland |         |
|-------------|---|--------|----------|---------|
| 2,882,765 A | * | 4/1959 | Andreasson | 408/59 |
| 2,895,355 A | * | 7/1959 | Kleine | 408/59 |
| 2,912,887 A |   | 11/1959 | Andreasson |       |
| 2,953,951 A | * | 9/1960 | Carlstedt | 408/705 |
| 5,125,772 A | * | 6/1992 | Kress | 408/57 |
| 5,860,773 A |   | 1/1999 | Blomberg et al. |   |
| 6,254,319 B1 | * | 7/2001 | Maier et al. | 408/57 |

FOREIGN PATENT DOCUMENTS

| FR | 892182 | * | 3/1944 | ............ 408/59 |
| SU | 891233 | * | 12/1981 | ............ 408/59 |

* cited by examiner

*Primary Examiner*—Daniel W. Howell
(74) *Attorney, Agent, or Firm*—Burns Doane Swecker & Mathis, LLP

(57) ABSTRACT

A deep hole drill for chip-removing drilling in a workpiece includes a body which has a cutting head and an integral cutting part. The body defines a longitudinal axis of rotation and has a longitudinal internal channel which opens into an end face of the cutting head for receiving cuttings that are entrained in a cooling medium. A chip removing insert is disposed on the cutting head. A support pad and a guide bar are disposed on a generally cylindrical outer peripheral surface of the cutting head and are arranged in circumferentially spaced relationship to one another. Cooling ducts are formed in the outer peripheral surface and are oriented generally parallel to the axis. The cooling ducts are open at the end face for conducting cooling medium thereto. The cooling ducts are situated adjacent the support pad and guide bar, respectively, for cooling same.

8 Claims, 5 Drawing Sheets

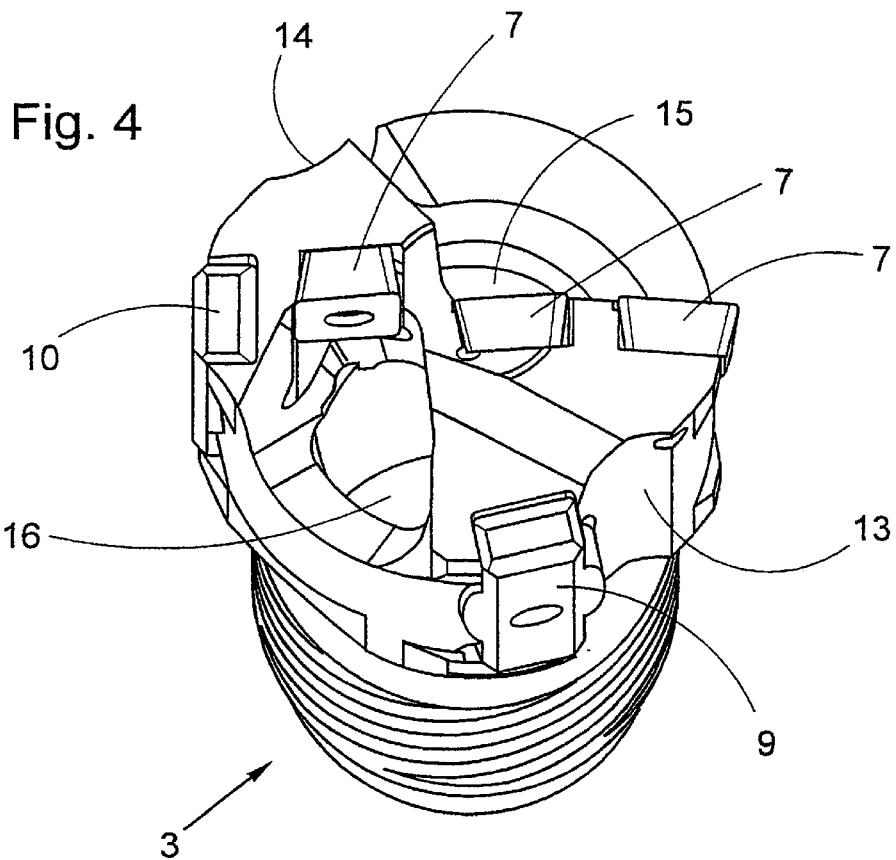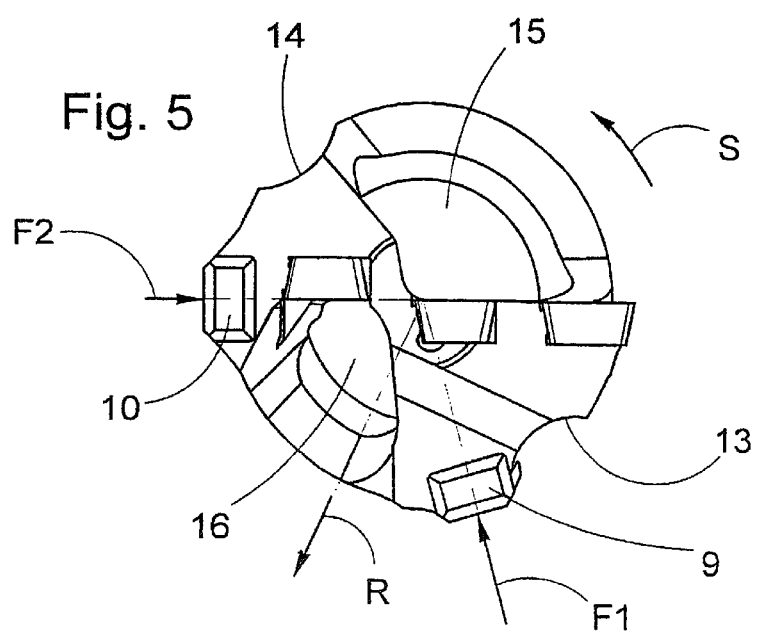

DEEP HOLE DRILL

TECHNICAL FIELD OF THE INVENTION

The present invention relates to a deep hole drill, which comprises a cutter head as well as a connecting part integrated with the cutter head which part has a thread, said cutter head being equipped with a chip removing cutting insert, at least one support pad as well as at least one guide bar, the said cutter head has at least one opening for discharging chips, said opening transforming into an inner channel of the cutter head. The two most common systems in deep hole drilling are presently the STS (Single Tube System) system and the Ejector system, the present invention relates to both these systems.

PRIOR ART

In deep hole drilling, in a workpiece a commonly occurring problem is that the support pads and guide bars, which are arranged on the cutter head, are subjected to the formation of crack, during the deep hole drilling. The reason for this is that the support pads/guide bars are normally made of solid cemented carbide, whereby said support pads/guide bars may be exchangeably fixed on the cutter head or in various ways connected by soldering to the cutter head. During the drilling process, the support pads/guide bars are exposed to high temperatures by the fact that the friction against the hole wall may be high. However, most often the entire support pad/guide bar does not abut against the hole wall, and therefore only a part of said support pad/guide bar is exposed to said friction. The cooling liquid flowing between the cutter head and the bore hole will not be in contact with the support pad/guide bar in those areas where abutment takes place between the support pad/guide bar and the hole wall to a sufficient extent. As a consequence of these interacting circumstances. i.e. high friction and deficient cooling, cracks arise in the support pads/guide bars, which reduce the service life of said support pads/guide bars.

AIMS AND FEATURES OF THE INVENTION

The present invention has as its aim the definition of a deep hole drill of the kind mentioned in the introduction, where the cooling liquid is given a greater possibility to provide cooling of the support pad/guide bar, in an efficient way, during drilling.

Yet another aim of the invention is to improve the chip removal, which reduces the risk for chips being stuck between the support pad/guide bar and the hole wall, which additionally may reduce the service life of said support pads/guide bars.

The aims of the present invention are realized by means of a deep hole drill for chip-removing drilling in a workpiece. The drill comprises a body which includes a cutting head and an integral connecting part adapted for connection to a drill tube. The body forms a longitudinal axis of rotation and has a longitudinal internal channel opening into an end face of the cutting head for receiving cuttings that are entrained in a cooling medium. A chip-removing insert is disposed on the cutting head. A support pad is disposed on a generally cylindrical outer peripheral surface of the cutting head. A guide bar is disposed on the outer peripheral surface in circumferentially spaced relationship to the support pad. A cooling duct is formed in the outer peripheral surface and is oriented generally parallel to the axis at a location adjacent to the support pad. The cooling duct opens at the end face for conducting cooling medium toward the end face. The cooling duct is situated adjacent the support pad for cooling the support pad.

BRIEF DESCRIPTION OF THE DRAWINGS

Below an embodiment of the invention will be described, reference being made to the accompanying drawings, where

FIG. 4 shows a perspective view obliquely from above of the deep hole drill according to FIG. 2;

FIG. 5 shows a front view of the deep hole drill according to FIG. 2, where the resultant of the cutting forces as well as the forces acting on the support pad and the guide bars are indicated;

DESCRIPTION OF PRIOR ART

Figure 1:
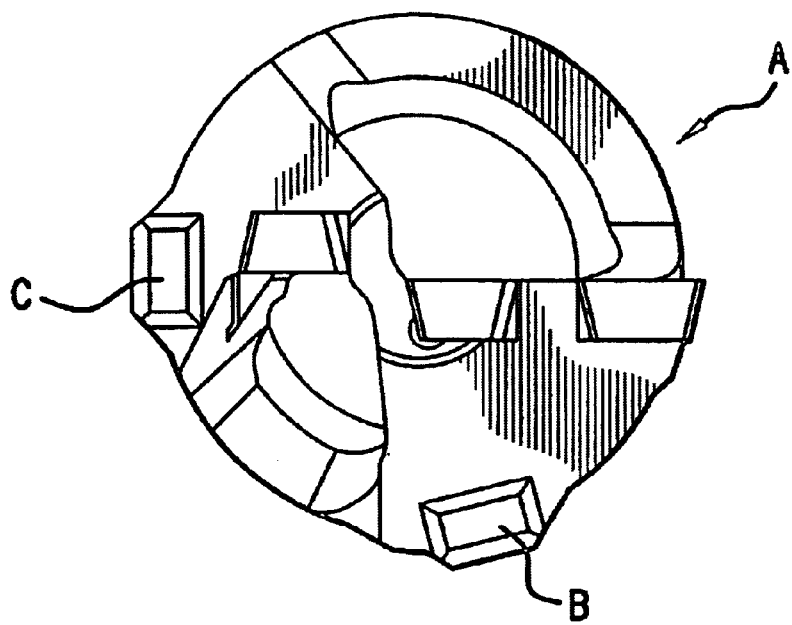
FIG. 1 shows a front view of a deep hole drill according to prior art.

First embodiment of a deep hole drill according to the present invention:

The deep hole drill A according to the prior art illustrated in FIG. 1 is provided with a support pad B and a guide bar C. In that connection, no special arrangements are taken to overcome the problems which have been discussed above under the heading Prior art, i.e. that the support pad B and the guide bar C are subject to crack formation.

The deep hole drill according to the present invention illustrated in FIGS. 2–5 comprises a cutter head 1 as well as a connecting part 3 integrated with the cutter head 1, which connecting part is provided with an external thread 5. The connecting part 3 is connected to a drill tube (not shown), via said external thread 5, which in turn is carried by a suitable supporting device.

The cutter head 1 is, in the usual way, equipped with cutting inserts 7, these however not being described in detail since they do not constitute a part of the present invention. Furthermore, the cutter head 1 is provided with a support pad 9 and a guide bar 10, which in the embodiment illustrated consist of exchangeable units according to the principle of indexable inserts. As is most clearly seen in FIG. 3, the support pad 9 and the guide bar 10 are provided with a chamfers 11 and 12, respectively, at the end thereof turned towards the connecting part In that connection, the chamfers 11, 12 are so formed that their abutment against the cutter head 1 takes place without there being any difference in level between the chamfers 11, 12 and the portions of the cutter head I which said chamfers 11, 12 abut against.

The cutter head 1 of the deep hole drill according to the present invention is also provided with a first cooling duct 13 and a second cooling duct 14, the first cooling duct 13 being situated adjacent to the support pad 9 while the second cooling duct 14 being situated adjacent to the guide bar 10. Said cooling ducts 13, 14 extend in the axial direction of the deep hole drill and are preferably parallel to the axial direction of the deep hole drill. In the embodiment illustrated, the cooling ducts 13, 14 are formed as concave countersinks in the cutter head 1, the cooling ducts having, when seen in cross-section, a softly rounded bottom with a certain radius of curvature.

The cutter head 1 is provided, in the usual way, with an inner channel for discharging the chips produced during the rotation of the cutter head 1 in relation to the workpiece. In that connection, the cutter head 1 is provided with a first opening 15, through which the majority of the chips produced are discharged, said first opening 15 being connected to the interior channel of the cutter head 1. The cutter head 1 has also a second opening 16, which also is used to discharge chips, said second opening 16 also being in connection with the interior channel. In the illustrated embodiment, the first opening 15 is somewhat larger than the second opening 16.

The function of the deep hole drill according to the invention:

In conjunction with a hole being drilled in a work-piece, the workpiece is clamped in a kind of fixture while the deep hole drill with the drill tube thereof is clamped in a rotatable chuck, and then the workpiece and the deep hole drill are pressed up against each other. The deep hole drill with the drill tube thereof is then brought to rotate and is displaced axially in relation to the workpiece, a hole being drilled in said workpiece. During the drilling process, the support pad 9 and the guide bar 10 abut against the hole wall, whereby a temperature rise takes place in the support pad 9 and the guide bar 10 by virtue of the friction against the hole wall. In this connection, reference is made to FIG. 5 which, on one hand, shows the resultant R of the radial cutting forces exerted by the cutting inserts 7 and, on the other hand, the forces acting from the hole wall on the support pad 9 and the guide bar 10 which compensate said resultant R. Then, it should be noted that force F1 acting on the support pad 9 is larger than the force F2 acting on the guide bar 10. As a result of this force distribution, the support pad 9 is exposed to a larger friction and thereby also a greater temperature rise.

In order to compensate for said temperature rise, cooling medium, commonly oil, is supplied into the space between the drill tube of the deep hole drill and the hole wall when an STS system is concerned, said cooling medium being brought to flow in the direction towards the cutter head 1. When the cooling medium reaches the cutter head 1, an accumulation of cooling medium takes place in the first and second cooling duct 13 and 14, respectively, the main part of the cooling medium flowing to the free chip removing end of the cutter head I via the first and second cooling ducts 13 and 14, respectively. Since the cutter head I rotates in the direction of the arrow S, see FIG. 5, i.e. the support pad 9 is to be found behind the first cooling duct 13 in the direction of rotation, said support pad 9 will pass through the accumulation of cooling medium which is generated by the first cooling duct 13. Thereby, a significantly improved cooling of the support pad 9 is achieved in comparison with the cooling which is obtained for a deep hole drill according to prior art.

It is true that a corresponding cooling of the guide bar 10 is not obtained, but an equally satisfactory cooling of the guide bar 10 is not required since the same it is exposed to a force F2 from the hole wall which is significantly smaller than the force F1 which the support pad 9 is exposed to.

Figure 6:
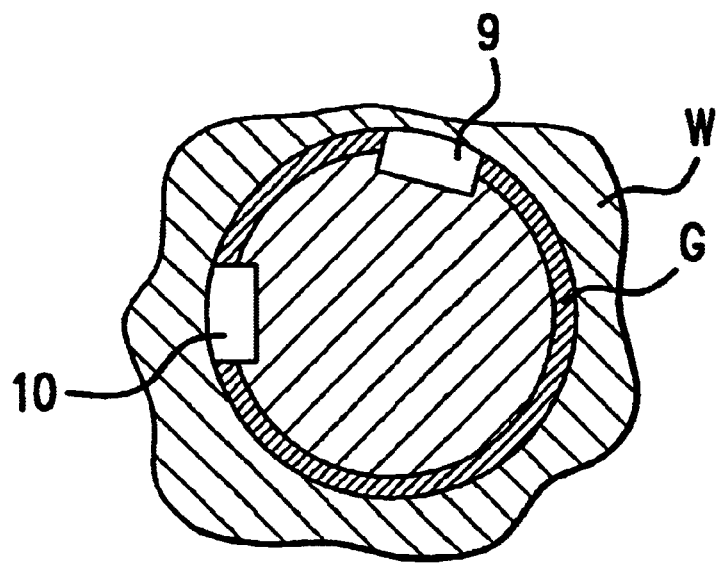
FIG. 6 shows schematically the surface, which lets through cooling liquid on a deep hole drill according to prior art.
Figure 7:
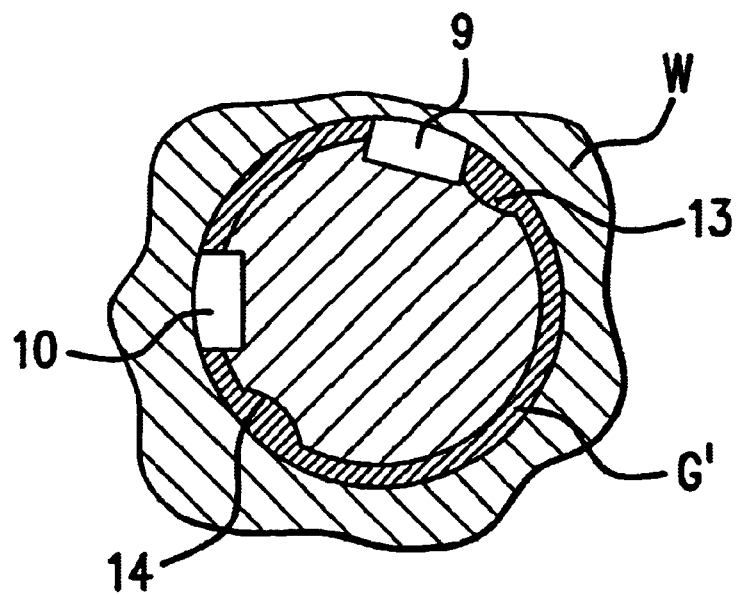
FIG. 7 shows schematically the surface which lets through cooling liquid on a deep hole drill according to the present invention.

In FIGS. 6 and 7, the difference in volume of cooling medium reaching the chip removing end of the cutter head 1 is schematically illustrated for a deep hole drill according to prior art, FIG. 6, and for a deep hole drill according to the present invention, FIG. 7. The space G (FIG. 6) or G' (FIG. 7) available for the cooling medium to flow forward in. For a deep hole drill according to prior art, see FIG. 6, the available space G is approximately 12% of the cross-section area of the drilled hole, while for a deep hole drill according to the present invention, see FIG. 7, the available space G for the cooling medium is approximately 15% of that cross-sectional area. This equals an increase of 20% when comparing deep hole drill according to prior art and a deep hole drill according to the present invention.

The increased volume of cooling medium which reaches the chip removing end of the cutter head 1 is, naturally, positive for the chip removal since the cooling medium turns at the chip removing end and pulls the chips with it through the first opening 15 and the second opening 16. The fact that the second cooling duct 14 is situated quite in front of the first opening 15. seen in the direction of rotation S, see FIG. 5, of the cutter head 1, ensures that an accumulated volume of cooling medium can turn back and flow through the first opening 15, said accumulated volume of cooling medium in an efficient way pulling chips with it from the chip removing end of the cutter head 1. The cooling medium then continues in the interior channel of the deep hole drill and further inside in the appurtenant drill tube (not shown).

Figure 3:
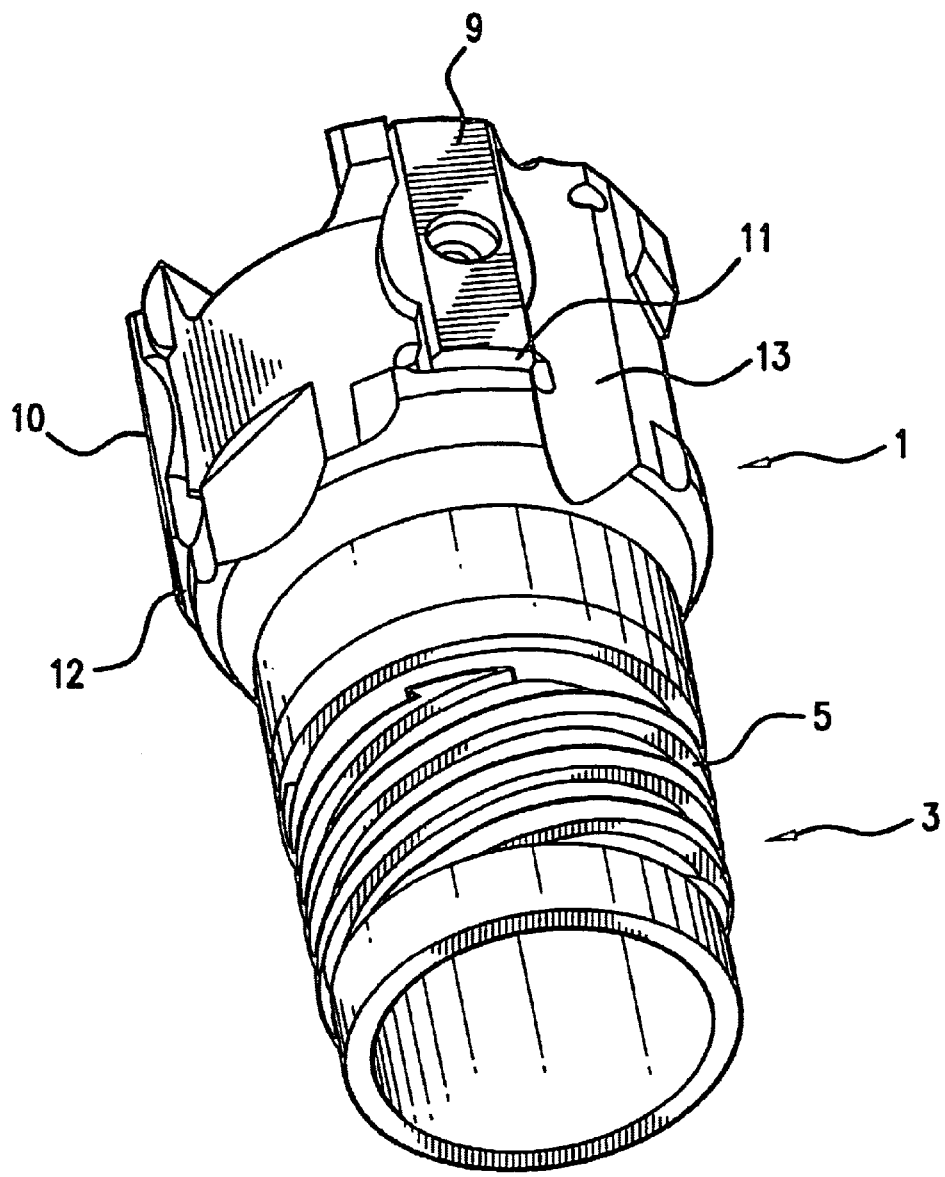
FIG. 3 shows a perspective view obliquely from below of the deep hole drill according to FIG. 2.
Figure 8:
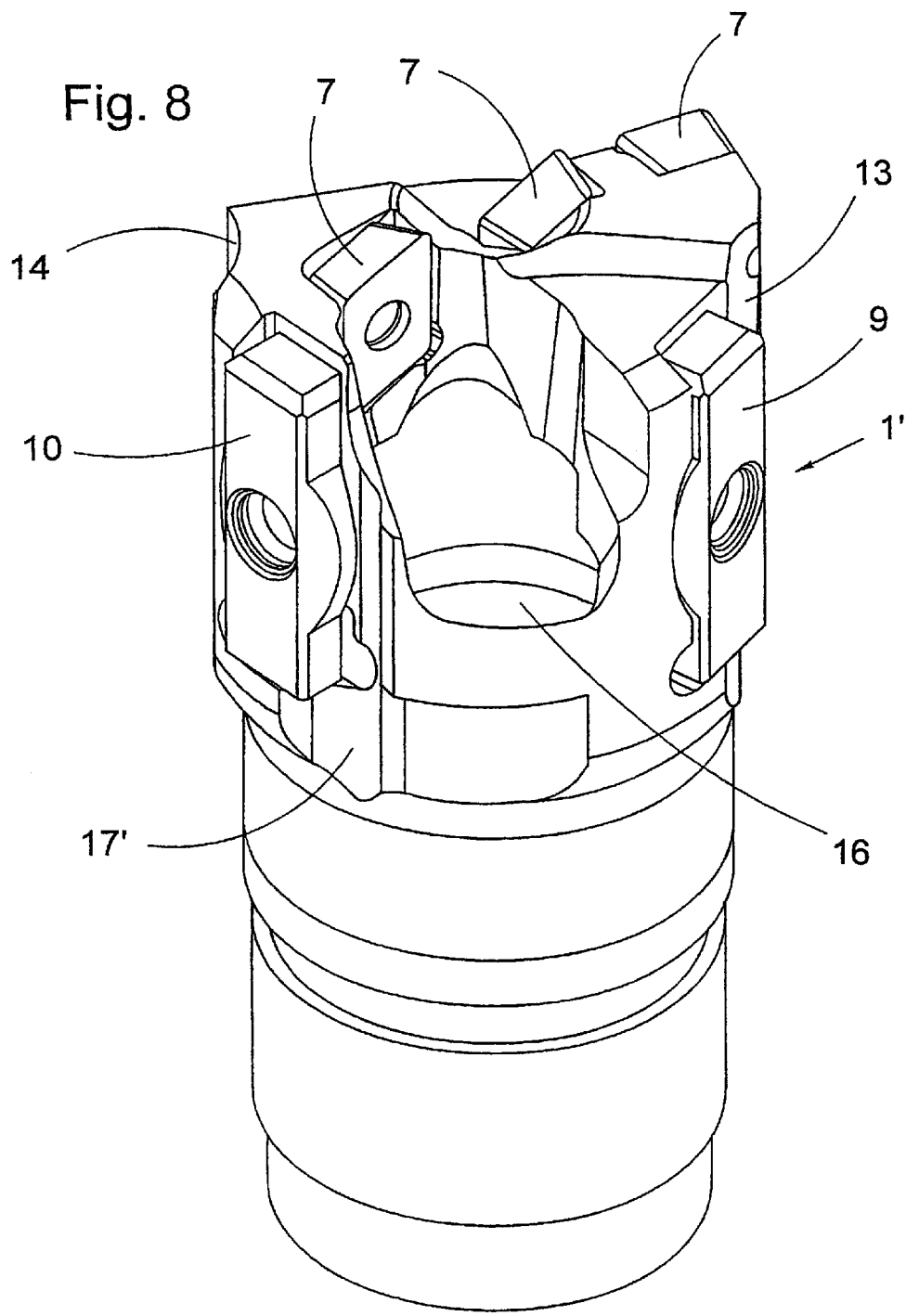
FIG. 8 shows a perspective view of an alternative embodiment of a deep hole drill according to the present invention.

Alternative embodiment of a deep hole drill of the present invention:

The deep hole drill illustrated in FIG. 8 comprises, like the embodiment according to FIGS. 3–5, a cutter head 1' as well as a fastening part 3, which in principle is identical with the fastening part 3 of the embodiment illustrated in FIGS. 3–5. The design of the cutter head 1' is what distinguishes the deep hole drill according to FIG. 8 from the deep hole drill according to FIGS. 3–5, and more precisely the arrangement of an additional cooling duct 17', i.e. a third cooling duct, which is situated besides and quite close to the guide bar 10, i.e., in direct proximity thereto. Thus, the deep hole drill according to FIG. 8 is provided with a first and a second cooling medium duct 13 and 14, respectively, which is seen in FIG. 8. If the same direction of rotation is valid for the deep hole drill according to FIG. 8 as the deep hole drill according to FIGS. 3–5, see arrow S in FIG. 5, the third cooling duct 17' is positioned in front of the guide bar 10 in said direction of rotation S. Said third cooling duct 17' should guarantee that the guide bar 10 receives a satisfactory cooling/lubrication by the cooling medium flowing in the third cooling duct 17'. Normally, the third cooling duct 17' has smaller dimensions than the first and second cooling ducts 13 and 14.

FEASIBLE MODIFICATIONS OF THE INVENTION

In the embodiment described above, two cooling ducts 13, 14 are arranged on the circumference of the cutter head 1. However, within the scope of the invention, it is feasible that only one cooling duct is arranged on the circumference of the cutter head 1, the cooling duct 13 which is arranged adjacent to the support pad 9, in that case, being preferable. The reason for this is seen in the description above when the cooling of the support pad 9 is discussed.

Figure 2:
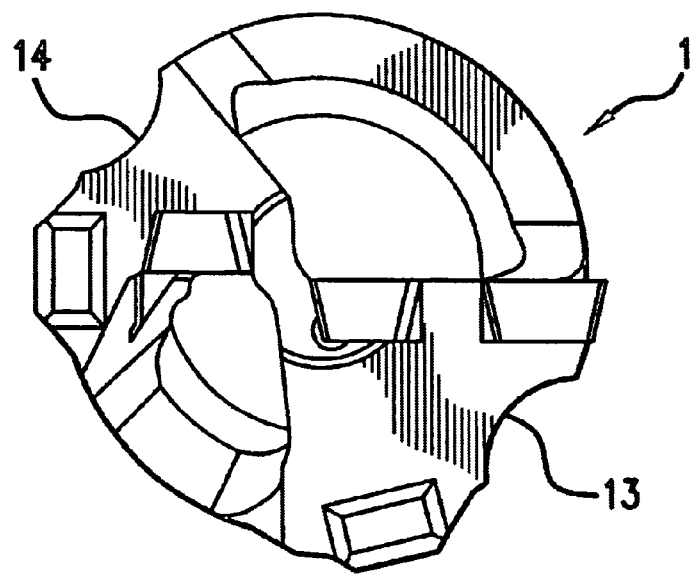
FIG. 2 shows a front view of an embodiment of a deep hole drill according to the present invention.

In the embodiment described above, the two cooling ducts 13, 14 are shown having in the main the same flow cross-section in FIG. 2. However, within the scope of the present invention, it is conceivable that, for instance, the second cooling duct 14 has a larger flow cross-section than the first cooling duct 13 since said second cooling duct 14 should serve two cutting inserts, i.e. let cooling medium pass which discharges chips from two cutting inserts.

In the embodiment described above, the support pad 7 and the guide bar 9 are in the form of exchangeable units according to the principle of indexable inserts. However, within the scope of the invention, it is feasible that the support pad/guide bar is connected by soldering to the cutter head I of the deep hole drill.

In the description above of the function of the deep hole drill according to the invention, it has been assumed that the so-called STS system is used. However, a deep hole drill according to the present invention may also be used, which has been pointed out in the introduction of this patent application, in, for instance, the so called Ejector system or other existing systems for deep hole drilling. In the Ejector system, double drill tubes are used, approximately half of the cooling medium turning around before it reaches the chip removing end of the cutter head I and thereby providing an Ejector effect which activates the cooling medium reaching the chip removing end and transports chips with it on its way from the chip removing end.

In the above description of the function of the deep hole drill according to the invention, the deep hole drill is rotated while the workpiece is not rotated. However, it is also feasible, within the scope of the invention, that the workpiece rotates while the deep hole drill do not rotate but only is axially displaced in relation to the workpiece. According to an additional variant, it is conceivable that both the deep hole drill and the workpiece rotate in opposite directions.

Thus, regardless of whether the drill is rotated relative to a stationary workpiece, or the workpiece is rotated relative to a stationary drill, or the drill and the workpiece are both rotated in opposite directions, the cooling duct 13 will be disposed on a side of the support pad facing the direction of rotary cutting, that is, facing in the same direction as the cutting inserts (i.e., facing in direction S in FIG. 5).

Reference being made to FIG. 7, it should be pointed out that the space G' other than the cooling ducts 13, 14 could be blocked, e.g., by fiber strips or the like, applied on the outside of the cutter head. By such an arrangement, the cooling medium is forced to flow only in said cooling ducts, at which an additionally improved cooling of the support pad/guide bar may be counted upon.

What is claimed is:

1. A deep hole drill for chip-removing drilling in a workpiece comprising:
   a body including a cutting head and an integral connecting part adapted for connection to a drill tube, the body defining a longitudinal axis of rotation and having a longitudinal internal channel opening into an end face of the cutting head for receiving and conducting cuttings entrained in a cooling medium;
   a chip-removing insert disposed on the cutting head;
   a support pad disposed on a generally cylindrical outer peripheral surface of the cutting head; and
   a guide bar disposed on the outer peripheral surface in circumferentially spaced relationship to the support pad;
   wherein a first cooling duct having a first cross-sectional area is formed in the outer peripheral surface and oriented generally parallel to the axis, the first cooling duct opening at the end face for conducting cooling medium toward the end face and is situated adjacent the support pad for cooling the support pad, and a second cooling duct having a second cross-sectional area is formed in the outer peripheral surface in circumferentially spaced relationship to the first cooling duct, the second cooling duct oriented generally parallel to the axis and opening at the end face for conducting cooling medium thereto, wherein the first and second cross-sectional areas are different from each other.

2. The deep hole drill according to claim 1 wherein the cutting insert faces a direction of rotary cutting, the cooling duct arranged on a side of the support pad facing in the direction of rotary cutting.

3. The deep hole drill according to claim 2 wherein the second cooling duct is arranged adjacent to the guide bar.

4. The deep hole drill according to claim 3 wherein the second cooling duct is arranged near a side of the guide bar facing opposite the direction of rotary cutting.

5. The deep hole drill according to claim 1 wherein the second cooling duct has a larger cross-sectional area than the first cooling duct.

6. The deep hole drill according to claim 1 wherein at least one of said first and second cooling ducts comprises a concave countersink formed in the outer peripheral surface, the countersink having a radiused bottom.

7. The deep hole drill according to claim 1 wherein the body is provided with an additional cooling duct in direct proximity to the guide bar.

8. The deep hole drill according to claim 7 wherein the additional cooling duct is arranged at a side of the guide bar facing in the direction of rotary cutting.

* * * * *